United States Patent Office 2,766,746
Patented Oct. 16, 1956

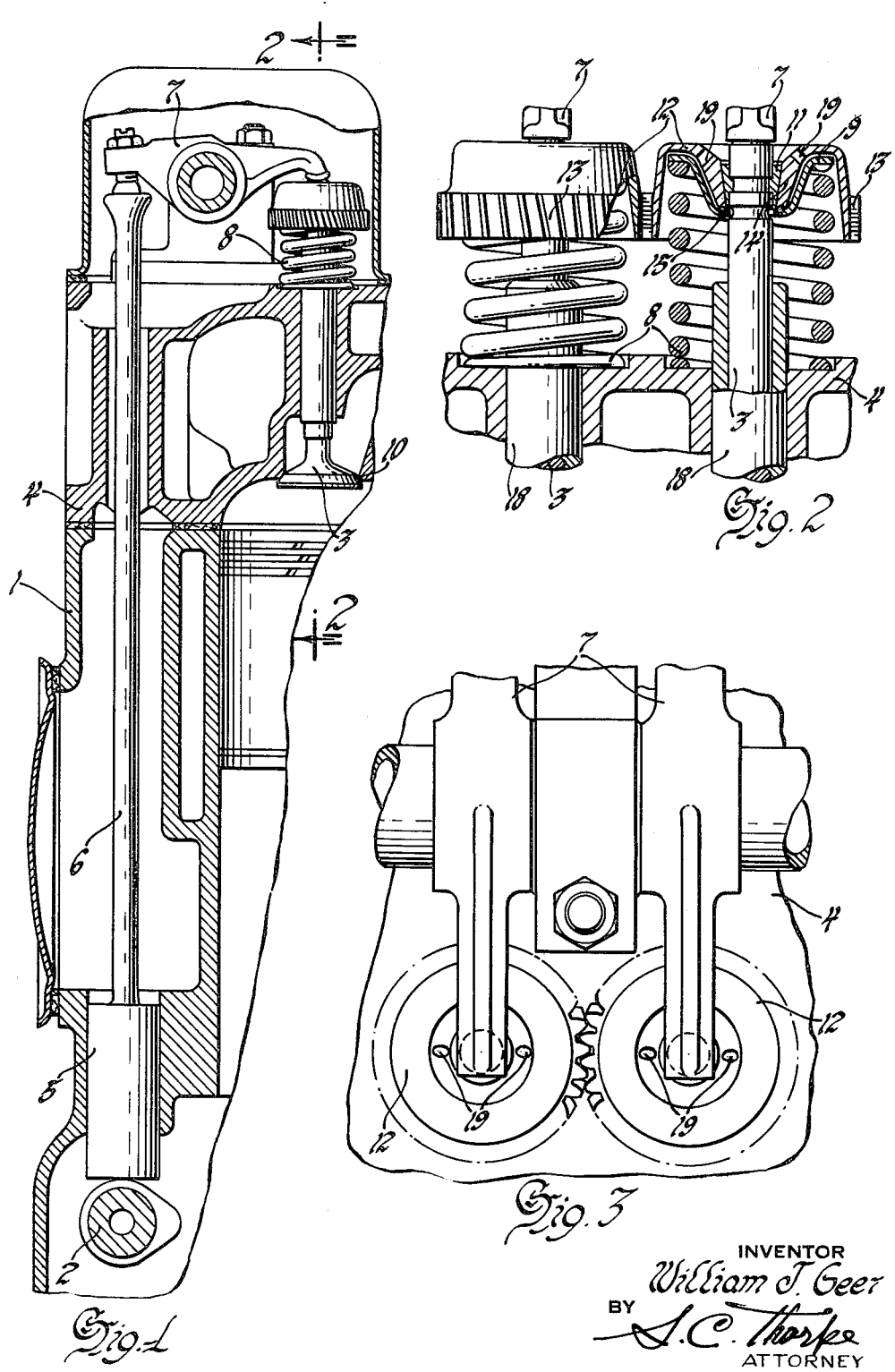

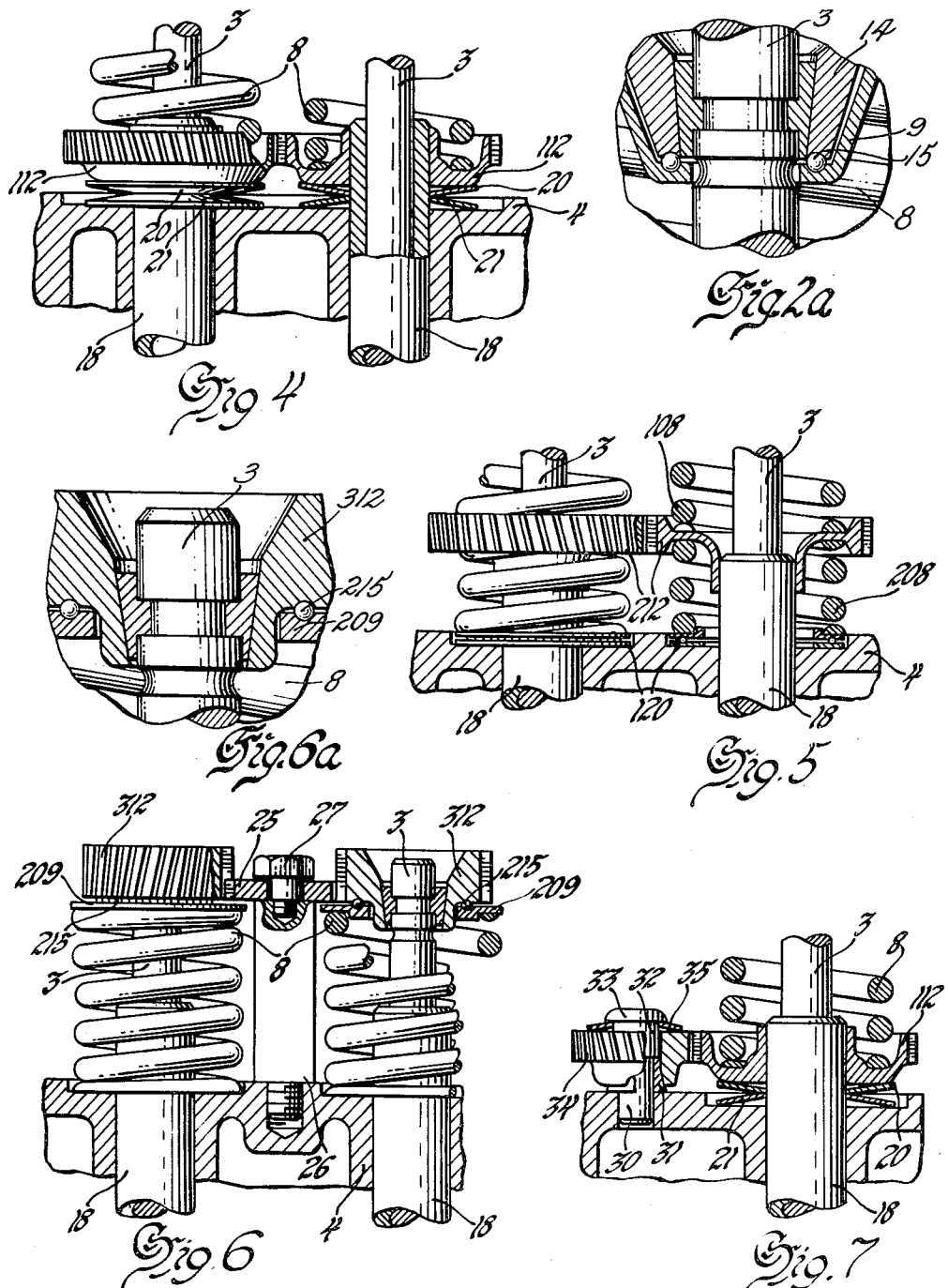

2,766,746

VALVE ROTATING MECHANISM

William J. Geer, Seattle, Wash., assignor to General Motors Corporation, Detroit, Mich., a corporation of Delaware Application September 24, 1954, Serial No. 458,121

11 Claims. (Cl. 123—90)

This invention relates to internal combustion engines and the like having rotatably and reciprocably mounted poppet valves controlling their operation, and particularly to mechanism for effecting valve rotation during reciprocation.

It is the principal object of the invention to provide a valve rotating mechanism in the form of a helical cam surfaced member coaxial with and rotatable with the valve, in cooperation with a coacting cam surfaced reaction means suitably mounted on an adjacent valve or other part of the engine whereby the first mentioned valve will be caused to rotate in one direction during at least a portion of each opening movement thereof in a progressive manner which will prevent its continuously seating in the same angular position and consequently improve the operating life of the valve and its seat. Various structural embodiments of my invention have been selected for purposes of illustration, and this and other objects thereof will be more fully understood from the following description, having reference to the drawings, wherein:

Figure 1 is a transverse sectional view through a portion of an internal combustion engine of the overhead valve type, incorporating one illustrative embodiment of the invention.

Figure 2 is an enlarged sectional view taken substantially on the line 2—2 of Figure 1.

Figure 2a is a further enlarged fragmentary view similar to Figure 2, showing the parts in greater detail.

Figure 3 is a view in plan of the valve rotating mechanism of Figures 1 and 2.

Figures 4–7 are views similar to Figure 2 but showing respectively different modifications of the invention.

Figure 6a is a further enlarged fragmentary view similar to Figure 6, showing the parts in greater detail.

Referring now in detail to the drawings, and particularly to Figures 1–3, the engine illustrated includes a cylinder and crankcase structure 1 in which is journalled a camshaft 2 for operatively opening a poppet valve 3 which is mounted for rotation and reciprocation in the cylinder head 4. The usual tappet 5, push rod 6 and valve rocker 7 are shown as constituting the valve opening linkage between the cam and the valve 3. Embracing the valve is a return spring 8 which reacts at one end against the cylinder head and at its opposite end against a valve retaining means in the form of a washer 9 to bias the valve closed against its seat 10 on the under side of the head.

As shown in Figures 2 and 3 the upper portions of the stems of two adjacent valves 3 are shown, one of which may be an exhaust valve and the other an intake valve, or both may be either intake or exhaust valves. Each of said valves, it will be understood, has its own cam and linkage opening means as illustrated for the one valve seen in Figure 1. Suitably fixed to the stem of each valve as by wedging engagement with the conventional split locks 11 is an externally toothed pinion 12 whose teeth 13 constitute helical cam surfaces and are in continuous coacting or meshing engagement with each other. The valve spring retaining washers 9 have rotary thrust bearing engagement with the under side of the hub portion 14 of each pinion 12, there being, as best shown in Figure 2a, anti-friction balls 15 inserted between these parts, although this is a matter of refinement and is not necessary to accomplish the desired result. One or more holes 19 are provided in the pinions 12 to feed lubricating oil to the thrust bearing surfaces of the pinions 12 and the washers 9.

During operation, as one valve (for example, the right hand valve shown in Figures 2 and 3) is moved downwardly in an opening direction away from its seat 10 while the other adjacent valve remains seated, the camming relation of the pinions 12 causes the right hand valve to rotate in one direction (e. g., clockwise as viewed in Figure 3, depending on the directional pitch of the teeth 13). This rotation continues until the left hand valve leaves its seat on its opening stroke, eliminating the reaction force effecting the rotation of the right hand valve, immediately following which the rotation of both valves is indeterminate. Next, after the right hand valve regains its closed or seated condition it serves as a reaction member producing rotation of the left hand valve in the opposite (e. g., counterclockwise in Figure 3) direction during the remaining portion of its opening movement, and in the same direction (e. g., clockwise in Figure 3) during that portion of its closing movement preceding reopening of the right hand valve.

The above mentioned alternate periods of rotation of the respective valves is repeated with each operating cycle of the engine, and the desired rate of progressive rotation per cycle may be obtained by selecting the proper pinion tooth helix angle in accordance with the amount of the "overlap" period (when both valves are unseated) and the out of phase relation between the respective opening and closing cycles of the two valves thus geared together. Very satisfactory results are thus obtained by so intergearing adjacent intake and exhaust valves of the same or different engine cylinders; however, it will be appreciated that the design is also applicable to any two adjacent valves which are timed so that a portion of their opening movements are coincident, yet out of phase with each other.

In the modification of Figure 4 the pinions 112 are located between the valve return springs 8 and the cylinder head 4, suitable bearing means and a second spring means being inserted between the head and the pinions. In the specific arrangement therein illustrated, such bearing means and spring means is in the form of two oppositely dished belleville washer springs 20 and 21 which have their convex faces opposing each other. It is to be understood that in this embodiment the valve spring retaining means at the opposite ends of the valve springs 4 are fixed (as by wedging engagement with the locks 11 in Figure 2) to rotate with the valves 3, rather than being in rotative bearing engagement therewith.

During operation of the Figure 4 modification, as the right hand valve moves downwardly in its opening direction the increased force of the return spring 8 causes the belleville springs 20 and 21 to collapse, with the result that the pinion 112 thereof also moves downwardly a distance relative to the meshing pinion of the left hand valve. The operation otherwise is the same in that while the left hand valve remains closed it serves as a reaction member to cause the right hand valve to rotate, and after the right hand valve regains its seat it serves conversely as the reaction means to produce rotation of the left hand valve.

Figure 5 illustrates a further arrangement wherein the pinions 212 are interposed between two axially adjacent upper and lower coil springs 108 and 208 biasing the valve closed. In this modification, as in Figure 4, the pinions 212 are journalled on the valve guides 18. Thrustably supporting the lower valve spring 208 and accommodating its rotation on the cylinder head is a conventional ball bearing 120. The operation of this embodiment is alike in all respects as that in Figure 4, but has the advantage thereover of enabling a greater magnitude of pinion axial movement with a correspondingly greater progressive valve rotation per cycle.

The Figure 6 modification is similar to that of Figure 2 except in having the pinions 312 fixedly carried by the valves and thrustably supported on anti-friction bearings 215, best shown in Figure 6a, which accommodate pinion rotation relative to the valve return springs 8 and their retaining washers 209. Instead of the pinions being in direct meshing engagement with each other, however, there is provided an idler pinion 25 between them and which is mounted on a bracket 26 fixed to the cylinder head 4, there being a shouldered cap screw 27 screwed into the upper end of the bracket 26 and journalling the idler pinion 25. The operation of this form of the invention is essentially the same as that of the others previously described except that the idler pinion transmits the reaction force from the pinion of the closed valve to the open valve.

Figure 7 shows an embodiment of the invention wherein each valve is rotated individually, without regard to the relative timing of any other valve of the engine. The pinion 112, as in the Figure 4 modification, is located below the valve return spring 8 and rests on the belleville springs 20 and 21 which accommodate its rotation and axial movement relative to the cylinder head 4. Adjacent the valve is arranged a stud 30 fixed in the cylinder head and having a suitable externally tapered sleeve pressed or otherwise secured thereto adjacent the cylinder head. Above the sleeve 31 is a cylindrical bearing member 32, also suitably secured to the stud 30 and terminating in a head portion 33. The tapered sleeve 31 and cylindrical bearing member 32 are embraced by the helically toothed pinion 34 meshing with the pinion 112 and normally urged into clutching engagement with the tapered sleeve 31 by a belleville spring 35 retained by the head portion 33. During operation of this form of my invention, as the valve 3 moves downwardly in opening, the pinion 112 also moves downwardly and through its engagement with the pinion 34 causes the latter to shift axially on the stud 30 into nonrotatable clutching engagement with the sleeve 31, hereby providing a reaction force to impart rotation to the pinion 112 and valve 3. This rotation continues throughout the valve opening stroke, at the end of which rotation stops, and during the return movement of the valve the pinion 34 is shifted axially upward on the stud 30 where it is free to journal rotatively on the cylindrical surface 32 thereof. The belleville spring 35 accommodates this upward shifting movement of the pinion 34, while insuring its quick re-engagement with the tapered sleeve 31 at the start of the next valve opening cycle.

It is appreciated that numerous minor changes in the construction and arrangement of the parts may be made without departing from the spirit and scope of the invention as defined in the following claims.

I claim:

1. In combination with a rotatably and reciprocably mounted poppet valve and reciprocating means therefor, a cam surface rotatable with the valve and helically disposed to the valve axis, a coacting cam surface member mounted for relatively opposite rotation about an axis parallel to the valve axis, and means alternately engaging said member to restrain its rotation and disengaging said member for rotation.

2. In combination with a rotatably and reciprocably mounted poppet valve and reciprocating means therefor, a cam surface rotatable with the valve and helically disposed about the valve axis, a coacting cam surface member fixed against movement during at least a portion of the valve reciprocating movement in one direction, and means for automatically releasing said member for rotation during at least a portion of the valve reciprocating return movement.

3. In combination with a poppet valve mounted for rotation and reciprocation, a seat therefor, a helically toothed pinion coaxially rotatable with the valve, means for intermittently moving the valve away from and permitting it to return to its seat, return spring means biasing the valve toward its seat with sufficient force to restrain its rotation when seated, a second helically toothed pinion meshing with said first named pinion, and means restraining rotation of said second pinion during at least a portion of each movement of the valve away from its seat.

4. In combination with two poppet valves having reciprocatory movements substantially out of phase with each other along generally parallel axes, and helically toothed pinions fixed to the respective valves for coaxial movement therewith, said pinions being in operative meshing engagement with each other.

5. In combination with a pair of rotatably mounted poppet valves having opening and closing movements substantially out of phase with each other along generally parallel axes, seating means and return springs associated with each valve effective to restrain its rotation between successive closing and opening movements, and operatively meshing helically toothed pinions fixed coaxially to the respective valves for transmitting rotation to each of the valves during its opening movement while the other of said valves is seated.

6. In combination with a pair of rotatably mounted poppet valves having opening and closing movements substantially out of phase with each other along generally parallel axes, seating means and return springs associated with each valve effective to restrain its rotation between successive closing and opening movements, return spring retaining means on each valve, and operatively meshing helically toothed pinions fixed coaxially to the respective valves for transmitting rotation to each of the valves during its opening movement while the other of said valves is seated, said pinions having thrust transmitting rotary bearing engagement with said retaining means.

7. The invention of claim 3, wherein said last-named means includes a second reciprocably and rotatably mounted poppet valve having a seat with which it is engaged and disengaged in out-of-phase relation with the seat and unseating cycle of said first-named valve, and a pinion fixed to said second valve and meshing with said second pinion.

8. The invention of claim 3, wherein said last-named means includes a second reciprocably and rotatably mounted poppet valve having a seat with which it is engaged and disengaged in out-of-phase relation with the seating and unseating cycle of said first-named valve, and return spring means for said second valve, each of said valves having spring-retaining means fixed thereto and means supporting their return spring means for coaxial rotation with their respective valves, each of said pinions being fixed coaxially to the respective return spring means intermediate said retaining means and said supporting means.

9. The invention of claim 3, wherein said last-named means includes a second reciprocably and rotatably mounted poppet valve having a seat with which it is engaged and disengaged in out-of-phase relation with the seating and unseating cycle of said first-named valve, and return spring means for said second valve, each of said return spring means including two longitudinally adjacent coil springs surrounding its respective valve, each of said valves having spring-retaining means fixed thereto opposite the end of one of its said coil springs most remote from the other of its said coil springs, a thrust bearing rotatably supporting the opposite end of each said other coil spring, said pinions being interposed between the adjacent ends of said coil springs.

10. The invention of claim 3, wherein said last-named means includes a second reciprocably and rotatably mounted poppet valve having a seat with which it is engaged and disengaged in out-of-phase relation with the seating and unseating cycle of said first-named valve, and return spring means for said second valve, each of said valves having spring-retaining means fixed thereto, and means resiliently supporting said spring return spring means in thrust and accommodating their coaxial rotation with their valves including a pair of convexly facing belleville springs, said pinions being thrustably interposed between their respective return spring means and adjacent belleville springs.

11. The invention of claim 3, wherein said last-named means includes a cylindrical journal therefor and a fixed clutch surface longitudinally adjacent said journal, said second pinion being axially shiftable on said journal into and out of rotary locking engagement with said clutch surface in response to change in direction of axial loading imposed on the second pinion with reciprocation of said first-named pinion, and means biasing said second pinion toward said clutch surface but yieldable under the axial force imposed on the second pinion by the first pinion during movement of the valve toward its seat.

References Cited in the file of this patent

UNITED STATES PATENTS

| | | |
|---|---|---|
| Re. 16,286 | Buck | Mar. 9, 1926 |
| 1,183,852 | Buck | May 23, 1916 |